Patented Aug. 26, 1930

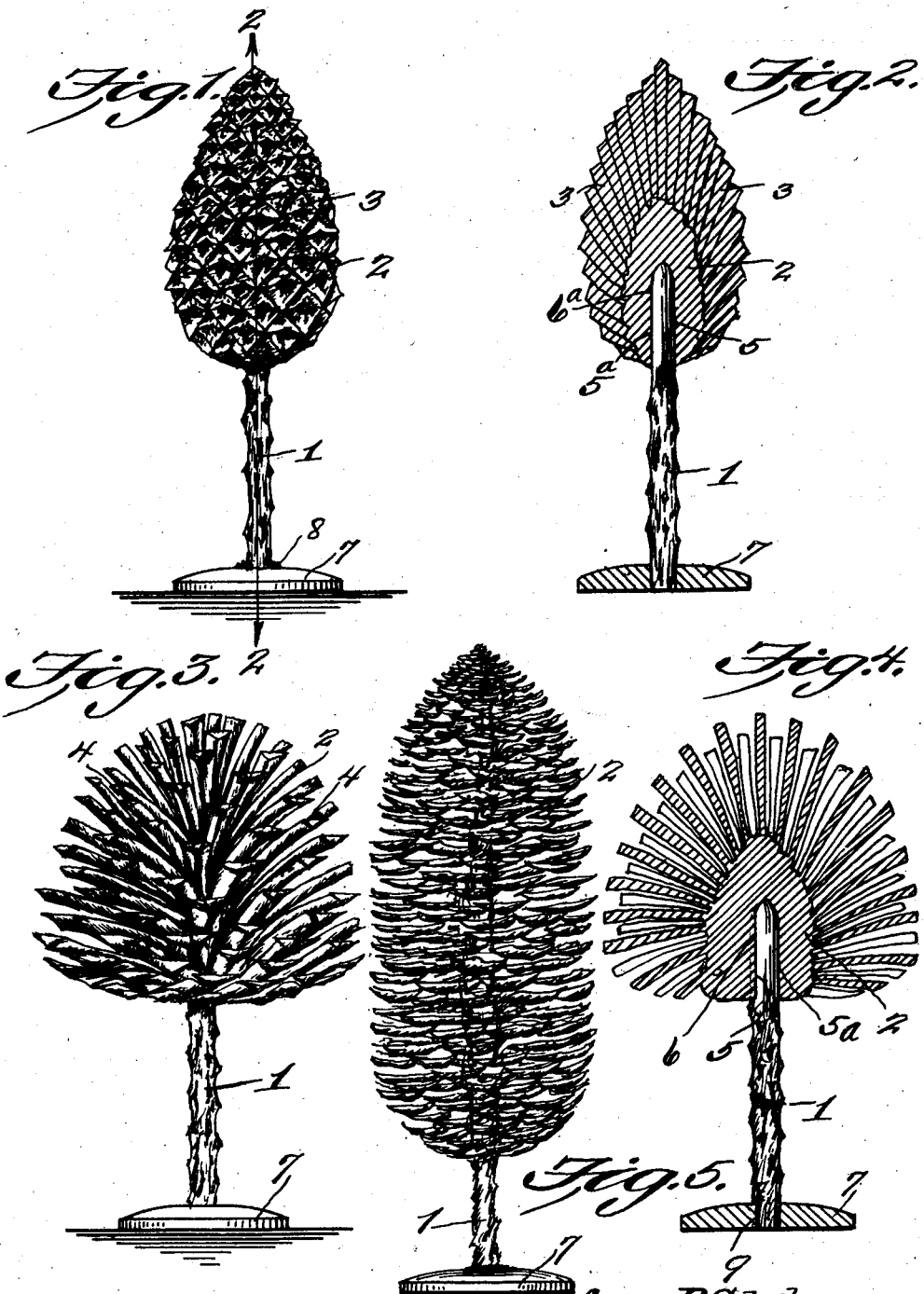

1,773,824

UNITED STATES PATENT OFFICE

AARON B. SCHEIBNER, OF AUDUBON, NEW JERSEY

ORNAMENT FOR CHRISTMAS-TREE GARDEN

Application filed February 25, 1929. Serial No. 342,457.

The present invention relates to an improved Christmas tree garden ornament, and the ornament may be produced by using pine tree burs or cones mounted upon stems having bases.

For example pine tree burs or cones at a certain time open up, and if they are not opened, it is possible to make them open by dipping the cone in a suitable solution.

It is the purpose to use the cones in open or closed condition or formation, and by coloring the cone either open or closed and mounting the cone on a stem having a base, the ornament may be made to simulate trees, hence providing foliage for a garden around a Christmas tree.

It is also the purpose to drill the cone or bur, fasten a stem, which may be made from twigs or short pieces or other parts of the pine tree, the cone or bur being mounted on the stem rigidly, with a suitable base connected to the stem, it being possible to mount the cone or bur so as to assume a straight position or a slight inclined position on the stem, so as to give various natural aspects to the ornament.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view of the ornament for a Christmas tree garden showing a pine cone or bur with the petals closed.

Figure 2 is a vertical sectional view of Figure 1 on line 2—2.

Figure 3 is a view in side elevation of a Christmas tree garden ornament, showing the petals of the cone open.

Figure 4 is a vertical sectional view through the same.

Figure 5 is a view in side elevation of a different shape of an ornament wherein this shape of cone or bur is used showing the petals open.

Referring to the drawings, 1 identifies the stem of the ornament, which may be constructed from a small branch or twig of a pine tree, and 2 is the cone or bur.

In Figures 1 and 2 the petals 3 are closed, while the petals 4 in Figures 3 and 4 are open.

The cone or bur is bored out as shown at 5 to receive the stem. In order to secure the stem in the bore of the cone and to prevent any rotation of the cone, the bore $5^a$ as in Figure 4 may have a flat portion 6 with which a flat portion of the stem may engage to prevent movement of the stem, the stem being inserted in the cone and held frictionally in position against being abstracted.

However, it is preferable to use adhesive material such as glue or cement as shown at $6^a$ to secure the stem in the bore of the cone.

The lower end of the stem may be similarly fastened in a base 7, for instance as in Figures 2 and 4, in the first instance adhesively secured at 8 in the base 7, which is in the form of a wooden button, or by means of flat portions as in Figure 4 as shown at 9. However any suitable means may be used to secure the parts together. In the manufacture of these ornaments for gardens around Christmas trees the cone or bur may be dipped in coloring matter, preferably giving the ornament a green color, in representation of green foliage, while the stems may have their natural color, in order to represent the trunk of a tree, preferably to represent the trunk of a pine tree.

The button or base, may in some instances be simply natural wood color, and in such instance the base may be hidden by moss or imitation green grass, or the base piece may be colored green and in this instance the base may rest on top of the moss or imitation grass.

As previously stated the cones may be taken from pine trees, those either with their petals closed or opened, and should there be an insufficient supply of opened cones it is to be understood that they can be made to open by dipping them in a suitable solution, for instance in cold water until they are thoroughly saturated and then they may be removed and placed in the sun, or in a dryer, after which they will open up wide as shown in Figure 3. If it is desirable to have them closed and the supply on hand are open, that may be saturated in hot water, causing them to close within a very short period.

The coloring matter for the cones or burs comprises chrome green and pine oil and naptha, in the following quantities: twelve pounds of chrome green to eight gallons of naptha and one-half pint of pine oil, the pine oil acting to give off a slight odor of pine and to assist in causing the chrome green to be absorbed into the cone or bur.

The invention having been set forth, what is claimed is:—

1. In a Christmas garden ornament simulating a tree, the combination with a stem provided with a base, through which the stem fixedly engages, of a pine tree cone having its petals spacedly open throughout simulating the foliage of a tree, the core of said cone being perpendicularly bored out to receive said stem, said cone and the open petals being saturated in a green colored matter which is absorbed in the fibre of the cone.

2. In a Christmas garden ornament simulating a tree, the combination with a stem provided with a base, through which the stem fixedly engages, of a pine tree cone having its petals spacedly open throughout simulating the foliage of a tree, the core of said cone being perpendicularly bored out to receive said stem, said cone and the open petals being saturated in a green colored matter which is absorbed in the fibre of the cone, and means to prevent the lower end of the stem from turning in the base.

In testimony whereof he affixes his signature.

AARON B. SCHEIBNER.